United States Patent
Selle et al.

(10) Patent No.: US 9,434,106 B2
(45) Date of Patent: Sep. 6, 2016

(54) METHOD AND APPARATUS FOR MAKING SKIRTLESS SEALS

(75) Inventors: Paul A. Selle, Appleton, WI (US); Gregory T. Prellwitz, Black Creek, WI (US)

(73) Assignee: CMD Corporation

(*) Notice: Subject to any disclaimer, the term of this patent is extended or adjusted under 35 U.S.C. 154(b) by 593 days.

(21) Appl. No.: 13/042,870

(22) Filed: Mar. 8, 2011

(65) Prior Publication Data

US 2011/0160029 A1 Jun. 30, 2011

Related U.S. Application Data

(63) Continuation of application No. 12/253,724, filed on Oct. 17, 2008, which is a continuation-in-part of application No. 12/159,979, filed on Jul. 2, 2008, which is a continuation-in-part of application No. PCT/US2007/000981, filed on Jan. 12, 2007, and a continuation-in-part of application No. 12/145,913, filed on Jun. 25, 2008, which is a continuation-in-part of application No. 11/937,870, filed on Nov. 9, 2007, which is a continuation-in-part of application No. 11/331,466, filed on Jan. 13, 2006, now Pat. No. 7,445,590.

(51) Int. Cl.
*B31B 1/14* (2006.01)
*B29C 65/74* (2006.01)
(Continued)

(52) U.S. Cl.
CPC ......... *B29C 65/7433* (2013.01); *B29C 59/007* (2013.01); *B29C 65/18* (2013.01); *B29C 65/222* (2013.01); *B29C 65/226* (2013.01); *B29C 65/228* (2013.01); *B29C 65/305* (2013.01); *B29C 65/38* (2013.01); *B29C 65/7437* (2013.01); *B29C 66/0044* (2013.01); *B29C 66/1122* (2013.01); *B29C 66/21* (2013.01); *B29C 66/232* (2013.01); *B29C 66/3472* (2013.01); *B29C 66/3474* (2013.01); *B29C 66/43* (2013.01); *B29C 66/7352* (2013.01);
(Continued)

(58) Field of Classification Search
USPC ....... 493/189, 193, 194, 199, 203, 205–206, 493/208, 233, 238, 365, 361, 363; 83/16, 83/171, 678, 695, 651.1; 156/583.4
See application file for complete search history.

(56) References Cited

U.S. PATENT DOCUMENTS 2,248,471 A 7/1941 Stroop
2,420,983 A 5/1947 Salfisberg
(Continued)

FOREIGN PATENT DOCUMENTS

| EP | 07718008.1 | 4/2012 |
|---|---|---|
| WO | 02/100722 A1 | 12/2002 |
| WO | 03/055760 A1 | 7/2003 |

OTHER PUBLICATIONS

TIPO's Search Report for Taiwan Patent Application No. 097142969. Jul. 25, 2013.
(Continued)

*Primary Examiner* — Christopher Harmon
(74) *Attorney, Agent, or Firm* — George R. Corrigan

(57) ABSTRACT

A machine and method for making bags is described and includes a web traveling from an input section to a rotary drum, to an output section. The rotary drum includes at least one seal bar, having a single sealing zone, and a weakening zone disposed within the single sealing zone. The single sealing zone may be a heated perforator, and may include a heating wire. The heating wire may be an NiCr wire stitched into the heater, and be disposed on a cap or on the seal bar. The weakening zone may create a line of weakness that is uniform or varies in intensity. The sealing zone may include temperature zones, cartridge heaters, cooling air, or heated air, or a source of ultrasonic, microwave or radiative energy.

6 Claims, 11 Drawing Sheets

(51) Int. Cl.

| | | |
|---|---|---|
| *B29C 59/00* | (2006.01) | |
| *B29C 65/18* | (2006.01) | |
| *B29C 65/22* | (2006.01) | |
| *B29C 65/30* | (2006.01) | |
| *B29C 65/38* | (2006.01) | |
| *B29C 65/00* | (2006.01) | |
| *B31B 19/00* | (2006.01) | |
| *B31B 19/64* | (2006.01) | |
| *B31B 23/00* | (2006.01) | |
| *B29C 65/14* | (2006.01) | |
| *B29K 1/00* | (2006.01) | |
| *B29K 23/00* | (2006.01) | |
| *B29L 31/00* | (2006.01) | |

(52) U.S. Cl.
CPC ........... *B29C 66/80* (2013.01); *B29C 66/8122* (2013.01); *B29C 66/8167* (2013.01); *B29C 66/81455* (2013.01); *B29C 66/81812* (2013.01); *B29C 66/8244* (2013.01); *B29C 66/82421* (2013.01); *B29C 66/83433* (2013.01); *B29C 66/83511* (2013.01); *B29C 66/8511* (2013.01); *B29C 66/91421* (2013.01); *B29C 66/91651* (2013.01); *B31B 19/00* (2013.01); *B31B 19/64* (2013.01); *B31B 23/00* (2013.01); *B29C 65/14* (2013.01); *B29C 65/1425* (2013.01); *B29C 65/229* (2013.01); *B29C 65/7471* (2013.01); *B29C 66/71* (2013.01); *B29C 66/73791* (2013.01); *B29C 66/81264* (2013.01); *B29C 66/81419* (2013.01); *B29C 66/81821* (2013.01); *B29C 66/81871* (2013.01); *B29C 66/919* (2013.01); *B29C 66/91212* (2013.01); *B29C 66/91231* (2013.01); *B29C 66/91315* (2013.01); *B29C 66/91423* (2013.01); *B29C 66/91431* (2013.01); *B29C 66/91631* (2013.01); *B29C 66/91641* (2013.01); *B29C 66/91653* (2013.01); *B29C 66/9241* (2013.01); *B29C 66/939* (2013.01); *B29C 66/93451* (2013.01); *B29C 66/949* (2013.01); *B29C 66/961* (2013.01); *B29C 66/962* (2013.01); *B29C 2793/0045* (2013.01); *B29K 2001/00* (2013.01); *B29K 2003/00* (2013.01); *B29K 2023/0625* (2013.01); *B29K 2995/006* (2013.01); *B29K 2995/007* (2013.01); *B29L 2031/7128* (2013.01); *B31B 2219/028* (2013.01); *B31B 2219/14* (2013.01); *B31B 2219/145* (2013.01); *B31B 2219/603* (2013.01); *B31B 2219/6038* (2013.01); *B31B 2219/6061* (2013.01); *B31B 2219/6076* (2013.01); *B31B 2237/10* (2013.01); *Y10T 83/0414* (2015.04); *Y10T 83/293* (2015.04); *Y10T 156/1054* (2015.01); *Y10T 156/1313* (2015.01)

(56) References Cited

U.S. PATENT DOCUMENTS

| | | | |
|---|---|---|---|
| 2,897,729 A | | 8/1959 | Ashton et al. |
| 3,030,750 A | | 4/1962 | Lowe et al. |
| 3,054,441 A | | 9/1962 | Gex et al. |
| 3,271,560 A | * | 9/1966 | Schott, Jr. ............. 219/243 |
| 3,300,365 A | | 1/1967 | Roos |
| 3,480,505 A | | 11/1969 | Donnell, Jr. et al. |
| 3,551,259 A | | 12/1970 | Schwarzkopf |
| 3,580,142 A | | 5/1971 | Stock et al. |
| 3,586,821 A | * | 6/1971 | Buob ..................... 219/243 |
| 3,616,095 A | | 10/1971 | Membrino |
| 3,854,031 A | | 12/1974 | Keller |
| 3,933,563 A | | 1/1976 | Carlisle |
| 3,982,991 A | | 9/1976 | Hamm et al. |
| 4,017,351 A | | 4/1977 | Larson et al. |
| 4,024,692 A | | 5/1977 | Young et al. |
| 4,114,520 A | | 9/1978 | Achelpohl et al. |
| 4,567,984 A | | 2/1986 | Gietman, Jr. |
| 4,632,667 A | | 12/1986 | McDonald et al. |
| 4,642,084 A | | 2/1987 | Gietman |
| 4,867,735 A | | 9/1989 | Wogelius |
| 4,872,942 A | | 10/1989 | Sharps, Jr. et al. |
| 4,889,522 A | | 12/1989 | Gietman, Jr. |
| 4,934,993 A | | 6/1990 | Gietman |
| 4,981,546 A | | 1/1991 | Bergevin |
| 4,991,376 A | | 2/1991 | Backman |
| 5,014,678 A | | 5/1991 | Matsuda |
| 5,094,657 A | | 3/1992 | Dworak et al. |
| 5,209,800 A | | 5/1993 | Spencer et al. |
| 5,277,745 A | | 1/1994 | Williams |
| 5,308,666 A | | 5/1994 | Borchardt |
| 5,318,237 A | | 6/1994 | Lotto et al. |
| 5,377,929 A | | 1/1995 | Gietman, Jr. et al. |
| 5,417,035 A | | 5/1995 | English |
| 5,417,638 A | | 5/1995 | Anderson et al. |
| 5,447,486 A | | 9/1995 | Anderson et al. |
| 5,518,559 A | | 5/1996 | Saindon et al. |
| 5,587,032 A | | 12/1996 | Saindon et al. |
| 5,611,627 A | | 3/1997 | Belias et al. |
| 5,683,340 A | | 11/1997 | Belias et al. |
| 5,816,990 A | | 10/1998 | Melville |
| 5,830,117 A | | 11/1998 | Anderson |
| 5,967,663 A | | 10/1999 | Vaquero et al. |
| 6,059,458 A | | 5/2000 | Belias et al. |
| 6,059,707 A | | 5/2000 | Belias et al. |
| 6,089,753 A | | 7/2000 | Belias et al. |
| 6,117,058 A | | 9/2000 | Sauder et al. |
| 6,119,439 A | | 9/2000 | Stevie |
| 6,139,479 A | | 10/2000 | Heiliger |
| 6,186,436 B1 | | 2/2001 | Selle et al. |
| 6,364,241 B1 | | 4/2002 | Bartels |
| 6,635,139 B2 | | 10/2003 | Bohn et al. |
| 6,648,044 B2 | | 11/2003 | Bohn et al. |
| 6,657,165 B1 | | 12/2003 | Makutonin |
| 6,746,389 B2 | | 6/2004 | Selle et al. |
| 6,789,371 B1 | | 9/2004 | Buysman |
| 6,792,807 B2 | | 9/2004 | Binder et al. |
| 6,894,737 B2 | | 5/2005 | Bae |
| 6,917,014 B2 | | 7/2005 | Makutonin |
| 6,951,996 B2 | | 10/2005 | Timans et al. |
| 7,214,173 B2 | | 5/2007 | Barclay et al. |
| 7,445,590 B2 | | 11/2008 | Selle et al. |
| 7,597,776 B2 | * | 10/2009 | Felk et al. ............. 156/583.1 |
| 8,029,428 B2 | | 10/2011 | Selle et al. |
| 2002/0104413 A1 | | 8/2002 | Adachi et al. |
| 2007/0068632 A1 | | 3/2007 | Bertram et al. |
| 2007/0167304 A1 | | 7/2007 | Selle et al. |
| 2008/0300121 A1 | | 12/2008 | Selle et al. |

OTHER PUBLICATIONS

Heat Transfer, A Basic Approach, M. Necati Ozisik, 7 pages (pp. 2, 59, 60, 745-747), publisher unknown, date unknown. cited by other.

* cited by examiner

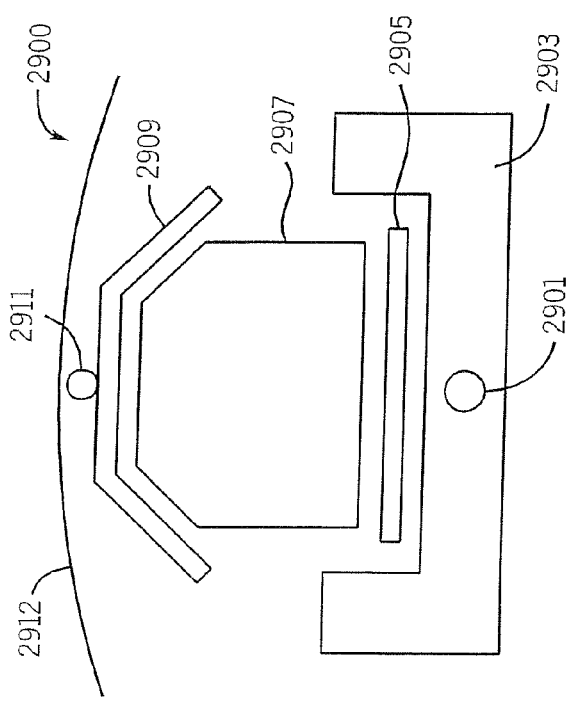
FIG. 9
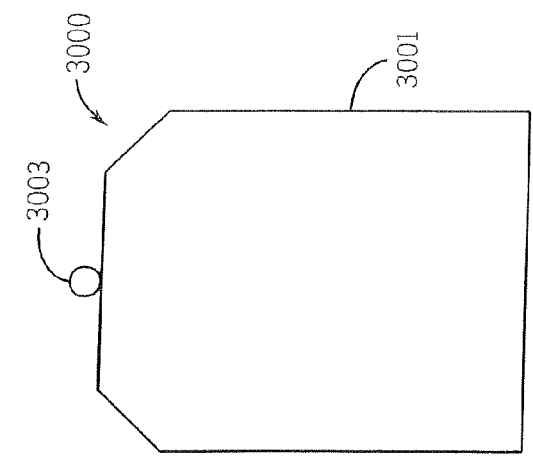
FIG. 10
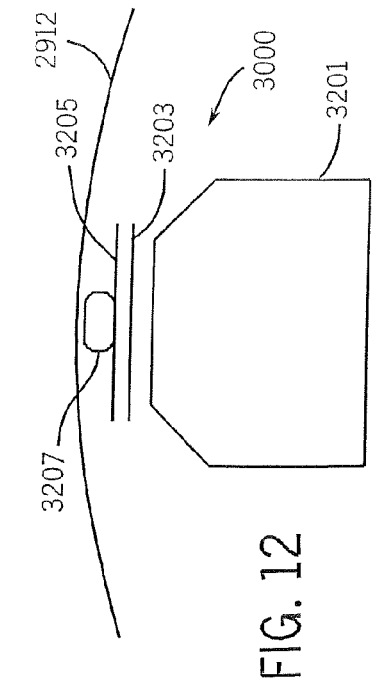
FIG. 11
FIG. 12

METHOD AND APPARATUS FOR MAKING SKIRTLESS SEALS

RELATED APPLICATIONS

This is a Continuation of, and claims the benefit of the filing date of, U.S. patent application Ser. No. 12/253,724, filed on Oct. 17, 2008, entitled Method and Apparatus For Making Skirtless Seals, which is a continuation-in-part of, and claims the benefit of the filing date of, U.S. patent application Ser. No. 12/159,979, filed Jul. 2, 2008, entitled Method and Apparatus For Making Bags which claimed priority and the benefit if the filing date of PCT Application No. PCT/US07/00981, filed Jan. 12, 2007, entitled Method and Apparatus For Making Bags, and is a continuation-in-part of, and claims the benefit of the filing date of, U.S. patent application Ser. No. 12/145,913, filed Jun. 25, 2008, entitled Method and Apparatus For Making Skirtless Seals, which is a continuation-in-part of and claims the benefit of the filing date of application Ser. No. 11/937,870, filed Nov. 9, 2007, entitled Method and Apparatus For Making Skirtless Seals, which is a continuation-in-part of and claims the benefit of the filing date of application Ser. No. 11/331,466, filed Jan. 13, 2006, and entitled Method and Apparatus For Making Bags, which issued on Nov. 11, 2008, as U.S. Pat. No. 7,445,590.

FIELD OF THE INVENTION

The present invention relates generally to the art of bag making. More specifically, it relates to bag making machines and a bag making method that create bags from a film or web and form seals and perforations or a line of weakness separating adjoining bags made from the web.

BACKGROUND OF THE INVENTION

There are many known bag machines. One style is a rotary drum machine. Rotary drum machines are well known, and a detailed description may be found in U.S. Pat. Nos. 6,117,058, 4,934,993, 5,518,559, 5,587,032 and 4,642,084 (each of which is hereby incorporated by reference).

A detailed description of the operation of rotary bag machines may be found in the patents above, but their general operation may be seen with respect to FIG. 1. A prior art rotary bag machine 100 continuously processes a film/web 201 using a dancer assembly 203, a pair of drum-in rolls 205 and 206 (203-206 are part of an input section), a sealing drum 208, a pair of drum-out rolls 210 and 211, a sealing blanket 213, a pair of knife-in rolls 215 and 216, a knife 218 (which could be any other web processing device such as a perforator, knife, die cutter, punching station, or folding station), a pair of knife-out rolls 219 and 220 (210-220 are part of an output section), and a controller 221. Input section, as used herein, includes the portion of a bag machine where the web is received, such as an unwind and a dancer assembly. Output section, as used herein, includes assemblies that act on a web downstream of the seals being formed, such as perforators, winders, folders, etc.

The web is provided through dancer assembly 203 to drum 208. Drum 208 includes a plurality of seal bars 209. The seals bars are heated and create the seals forming the bags from web 201. Web 201 is held against drum 208 (and the seals bars) by a Teflon® coated blanket. The distance between seals created by the drum is related to the bag length (for bags formed end to end) or the bag width (for bags formed by making side seals). End to end bags are formed with one seal from the drum, and side to side bags are formed with a pair of seals. The drum diameter may be adjusted and/or less than all of the seal bars turned on to determine the distance between seals, and hence bag size.

The prior art of FIG. 1 provides that after web 201 leaves drum 208 it is directed to rotary knife 218, which creates a perforation between bags, or could separate adjoining bags. When the bags are end to end bags the perforation is placed close to the single seal such that when the bags are separated, the perforation and the perforated end is the top of one bag, and the seal is the bottom of the adjoining bag for end seals, or sides of adjacent bags for side seals. Ideally, the perforation is close to the seal to reduce waste, although this is difficult in practice. When bags are formed side to side, the perforation is made between the pair of seals. A seal is needed on both sides of the perforation, since the side of both bags should be sealed. The web between the pair of seals is wasted. Thus, the pair of seals should be close to one another to reduce waste, although this is also difficult in practice.

Controller 221 is connected to the various components to control speed, position, etc. Sensors may be used to sense print on the web to form the seals and/or register the perforation (place it in the correct location with respect) to the seal. Also, sensors may detect seals to try and create the perforation in the correct location. Sensing the seal has proven to be difficult. One prior art example of a system that sensed seals is described in U.S. Pat. No. 6,792,807, hereby incorporated by reference. If the perforation is placed too close to one side seal, then the seal may be cut off, rendering the bag useless.

Because sensing the seal is difficult, waste is generated in bag making, or bags are ruined. The wasted web, (i.e. the web between a seal and the adjacent perforation), or the web used to make the ruined bag, can be costly, particularly for high speed bag machines where the number of bags made per hour is great.

Another problem of prior art machines is that perforations may be skewed with respect to the seals, because the perforations are created downstream, and the web can wander or stretch. Also, a mechanical perforation knife must be adjusted every few days to continue to perform properly. Generally, sharp mechanical knives cannot be adjusted to change the perforation strength, and they can be costly, complex, and difficult to use.

Other type of bag machines, such as intermittent motion machines (not rotary drum machines) use burn off seals to seal and cut or perforate at the same time but speed is limited to about 300 fpm due to the reciprocating motion, dwell time, and difficulty handling the loose bags. Other intermittent motion machines, such as the CMD Icon™, have seal bars with an integral toothed blade. The CMD CM300™ machine has oscillating motion to move seal bars that have an integral toothed blade. Generally, intermittent motion machines are not as fast as rotary drum continuous machines, and thus produce far fewer bags per machine hour.

Some prior art rotary drum bag machines create two parallel seals, and a perforation therebetween as the film moves with the drum. For example, U.S. Pat. No. 6,635,139 to Bohn, et al., and prior related application US 2007-0167304, Selle et al., which issued as U.S. Pat. No. 7,445,590 on Nov. 4, 2008, both of which are hereby incorporated by reference.

Accordingly, a method and machine for making bags that enhances the ability to locate the perforations close to the seals is desirable. Preferably this can be done without a downstream knife, to avoid problems associated therewith. Also, this is preferably done on a continuous motion machine, to avoid the slowness and difficulties associate with intermittent machines.

SUMMARY OF THE PRESENT INVENTION

A bag machine, according to a first aspect of the invention, includes an input section, a rotary drum, and an output section, wherein a web travels from the input section, to the rotary drum, to the output section. The rotary drum includes at least one seal bar which has a single sealing zone that forms a single seal, and further includes a weakening zone within the first sealing zone, that forms a weakened zone within the single seal.

According to a second aspect of the invention, a bag is made by receiving a web, forming a single seal on the web using a seal bar on a rotary drum, and forming a weakened area within the single seal. The weakened area is formed during at least a portion of the time the first seal is being formed.

According to a third aspect of the invention a perforator for a rotary bag machine is an insert for a rotary drum including a single sealing zone and a weakening zone within the single sealing zone. It may or may not be retrofitted to existing machines.

According to another aspect of the invention a bag machine includes an input section, a rotary drum, and an output section, disposed to receive the web from the rotary drum. The rotary drum has at least one seal bar that includes a sealing zone that forms a single seal, and a heating wire that is a weakening zone within the sealing zone, that forms a weakened zone within the single seal. There is a release layer on at least a part of the at least one sealing zone.

The weakening zone is a heated perforator, and/or includes a heating wire, and/or a thin film heater according to various embodiments.

The heating wire has, connected thereto, a source of power that is at an adjustable voltage or magnitude, and/or pulsed, and/or a feedback loop is provided in other embodiments.

The heating wire is a nickel chromium resistance wire, preferably about 80% nickel and about 20% chromium, and/or a thin film heater, and/or a resistance heater, and/or disposed to be make intermittent contact with the web, and/or has a resistance of about 4 ohms/ft, and/or disposed in an insert and/or cartridge on the seal bar in various embodiments.

The insert is comprised of Muscovite® mica, Phlogopite® mica, Glastherm® composite, or similar electro-insulating material and/or has a plurality of holes disposed along a line in the cross direction in other embodiments.

The single seal extends at most 0.125, 0.25 or at most 0.75 inches in the machine direction in various embodiments.

The weakening zone is disposed to create a line of weakness that varies in intensity, and/or is a separating zone, and/or includes a heat film, and/or includes a toothed blade, and/or includes a row of pins, and/or includes a source of air directed at the web, and/or includes a source of vacuum in various embodiments.

The toothed blade is retractable in accordance with another embodiment.

The first sealing zone includes a plurality of independently controlled temperature zones capable of making side seals and tape seals and/or includes at least two parallel sealing subzones, extending in the cross machine direction, and the perforating zone is disposed between the at least two parallel sealing subzones in various embodiments.

The single sealing zone include a plurality of independently controlled temperature zones capable of making side seals and tape seals, and/or include cartridge heaters with a plurality of heat zones, and/or include a source of air disposed to cool at least a portion of the single sealing zone, and/or include at least one port for directing heated air to the web, and/or include at least one of a source of ultrasonic energy, microwave energy, and/or of radiative heat in various embodiments.

A sealing blanket is disposed to hold the web against the rotary drum and may be made of polyester material with a silicone layer that contacts the web in other embodiments.

The rotary drum has an adjustable diameter in another embodiment.

The weakened area is formed for less than the time the first seal is being formed, and formed for about half the time the first seal is being formed in various embodiments.

Forming a weakened area includes, forming a consistently weak line, and/or forming a perforation, and/or forming a line of weakness that varies in intensity, and/or separating adjoining bags, and/or applying a vacuum to the web, and/or directing air at the web in other embodiments.

Forming a perforation includes heating a wire, and/or resistance heater, and/or thin heat film, and/or contacting the web with a toothed blade that may or may not be retracted after the perforation is formed, and/or contacting the web with a row of pins, and/or forming an auxiliary seal adjacent the perforation in various embodiments.

The wire has power applied thereto at an adjustable voltage, and/or that is pulsed in other embodiments.

A signal indicative of heat in the wire is monitored and the power applied is controlled in response thereto in various embodiments.

The single seal extends at most 0.125, 0.25 or at most 0.75 inches in the machine direction in various embodiments.

Forming a single seal includes bringing at least two parallel sealing subzones into thermal contact with the web, and forming the weakened area includes bringing a weakening zone disposed between the parallel sealing subzones into thermal contact with the web in another embodiment.

The single seal has a plurality of independently controlled temperature zones, and/or are cooled, and/or are formed using ultrasonic energy, microwave energy, and/or radiative heat in various embodiments.

According to other embodiments, the sealing zone is comprised of a heating wire, an electrical insulating layer/release layer, a glasthemi or mica layer, and an aluminum block, in that order, where the wire and electrical insulating layer/release layer come into contact with the film.

The release layer may be comprised of a material such as Kapton® and/or Teflon® tape, and the heating wire is stitched into the sealing zone, and/or a material is disposed under the heating wire in various embodiments.

The sealing zone surface may be a cap and/or have an arcuate shape that contacts the film in other embodiments.

The sealing zone and/or the weakening zone include a draw tape area where the release layer is raised in the draw tape area relative to the remainder of the sealing zone in one embodiment.

The sealing zone can be an aluminum block heater in one embodiment.

The heating wire is mounted in and between the plurality of holes in the aluminum block heater in one embodiment.

According to other embodiments, the sealing zone is comprised of a double sided tape, a heater, a heat conductive layer, a wire and a release layer, in that order, where the release layer comes into contact with the film.

Other principal features and advantages of the invention will become apparent to those skilled in the art upon review of the following drawings, the detailed description and the appended claims.

BRIEF DESCRIPTION OF THE DRAWINGS

FIG. 9 is an end view of a seal bar in accordance with the present invention;

FIG. 10 is an end view of a seal bar in accordance with the present invention;

FIG. 11 is an end view of a seal bar in accordance with the present invention;

FIG. 12 is an end view of a seal bar in accordance with the present invention;

Figure 1:
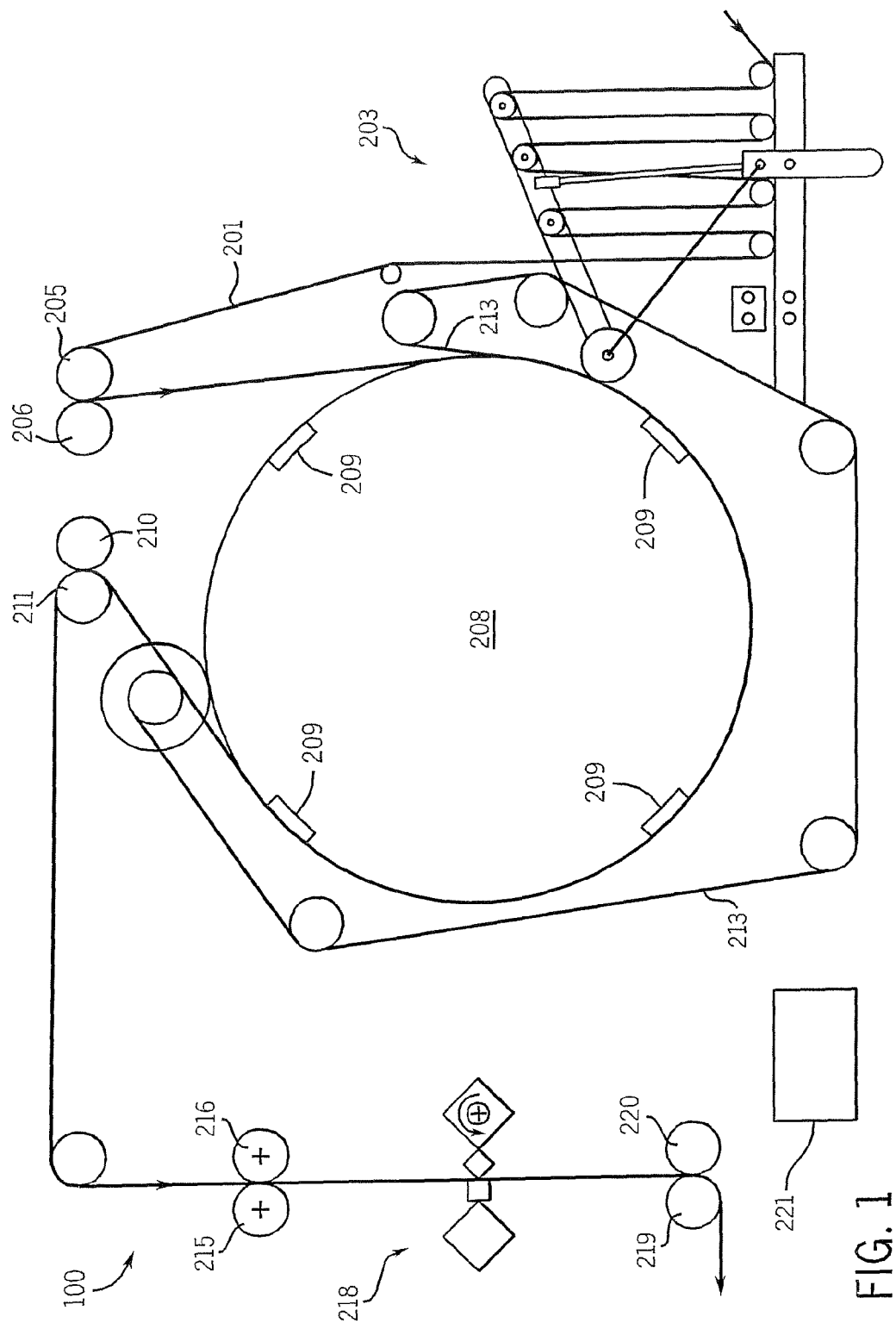
FIG. 1 is bag machine in accordance with the prior art.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular bag machine, it should be understood at the outset that the invention can also be implemented with other machines, and using other components. Bag machine, as used herein, includes a machine used to make bags such as draw tape bags, non-draw tape bags, and other bags. Any input section (unwinds and dancers, e.g.) and any output section (winders, folders, e.g.) may be used with the present invention. Bags may be comprised of traditional poly material, other materials such as starch, polyactic acid (PLA), cellulose, polyhydroxy alkanoates (PHA), and lignin, and/or be biodegradable, compostable, etc., such as Mater-Bi®, Ecoflex®, Ecovio®, Bioplast GF106®

Generally, the present invention provides for a rotary bag machine with an input section, a drum section, and an output section. A single seal is formed, and a perforation or line of weakness is formed within the single seal, as the film moves with the rotating drum. Thus the single seal, with the perforation therewithin, forms seals for two adjacent bags.

Preferably, the single seal is created using a single sealing zone. alternatively, the single sealed area can be created using two seals that melt to form a single seal, or a single sealing zone. In either case, the single seal is comprised of two parallel sealing subzones, with a perforation or weakened area within the single seal. Other sealing techniques may be used. The single seal can be combined with other embodiments, such as hem or draw tape seals, varying intensity seals and perforations, etc.

The seals and perforations can be formed for less than the time the film is about the drum. For example, on a rotary bag machine the web might be in contact with the drum for about one-half of the drum cycle, and the perforation formed in one quarter of the drum cycle. The seal bar includes a sealing zone and applies heat as the drum rotates, thus forming the single seal.

Seal bars, as used herein, includes an assembly, such as on a rotary drum, that applies heat to and seals the web, and the mounting mechanisms, perforators, etc. Sealing zone, as used herein, includes the portion of a seal bar that creates the seal. Within the sealing zone, as used herein, includes, within the boundaries of a single sealing zone. Within a single seal, as used herein, includes, within the boundaries of a single seal. Single seal, as used herein, includes, an area of film that is melted to form a seal without unsealed portions that extend a substantial distance in the cross machine direction. A single seal may have small gaps in the seal, either intentionally or inadvertently, and may have one or more subzones.

The seal bars can have independently controlled cross machine temperature zones, for example for applying more heat to a hem or draw tape portion of a side seal. Independently controlled temperature zones, as used herein, includes temperature zones along a sealing zone that can be controlled or caused to be different temperatures.

A perforator or weakening zone is mounted within the single sealing area, and may be part of a cap or insert. The weakening zone creates a perforation or weakened area as the seal is being formed. The perforation can be created with heat, radiation, or by mechanical contact. Weakening zone, as used herein, includes the portion of a seal bar that creates a weakened area. Weakened area, as used herein, includes an area on the web which is weakened, such as by a perforation or a portion of the web being melted or burned off.

The cap can alternatively include a separating zone for separating adjoining bags. This typically requires more heat than weakening or perforating. Separating zone, as used herein, includes the portion of a seal bar that separates adjoining bags. One embodiment provides for retrofitting existing machines by placing a cap or insert on existing seal bars, or by replacing seal bars with seal bars designed to have a weakening zone, such as with an insert.

Thus, the perforation is located consistently and correctly within the single seal that forms the sides of adjacent bags. Less film is wasted because the distance between the pair of side seals is less. While typical prior bag machines have one inch between side seals, the preferred embodiment creates a single seal about 0.65 inches across that is the seal for two adjacent bags. Thus, each bag has a side seal of about 0.325 inches, with no space between the seal and the edge of the bag. About, as used herein, includes a magnitude being close enough to a given value to function substantially the same as if the magnitude were the given value.

A wide variety of perforators can be used, such as a heating wire, heat film, toothed blades, etc. Heat film, as used herein, includes a film used to apply heat to a specific area. The perforation strength may be adjusted by controlling the amount of heat (or pressure) applied at the perforator. The perforation may be clearly defined, a line of weakness, or a line of weakness that varies in intensity. Line of weakness that varies in intensity, as used herein, includes varying web strength along a line or curve, such as a perforation or such as a line where the web is not removed, but alternates between low and higher strength regions.

The heated perforator may include a wire in intermittent contact with the web, to create the perforation pattern. Intermittent contact between the web and a sealing or perforating element, as used herein, includes the web being in contact with the element at some locations and not in contact at other locations, such as contact and no contact alternations along a cross-machine direction line.

Heated perforator, as used herein, includes a device that uses thermal energy to perforate, through contact, convection, conduction or radiative heat. Heating wire, as used herein, is a wire used to heat, such as by passing electrical current therethrough. Radiative heat, as used herein, includes heat in the form of electromagnetic radiation, ultrasonic radiation, thermal radiation, etc.

The blanket may be blankets such as those found in the prior art, although the preferred embodiment includes a blanket that is a belt consisting of 2-ply polyester material with 1/32" ground silicone top cover Silam K® (55 durometer) with an endless length. Other blankets, preferably able to handle the high intermittent temperatures (600-800 F) that can be reached while burning a perforation and that have good release characteristics so the film does not stick to the belting, are contemplated in various embodiments, and may be Teflon®, silicon, hybrids, etc. Another embodiment uses a fine fabric mesh impression in the silicon surface of the blanket. This results in an impression made in the film that can aid in sealing or perforating and also improve the release characteristics. One embodiment provides for the blanket to have a 0.03-0.012 in. thick silicone rubber top surface with a matte finish, durometer 50-90 Shore A, initially seasoned with a talc powder. Another embodiment uses the fine fabric impression (bumpy or textured) blanket, such as a Habasit® WVT-136 silcone rubber blanket, such that the pressure of the "bumps" burns through the plastic to form the weakened zone.

Figure 2:
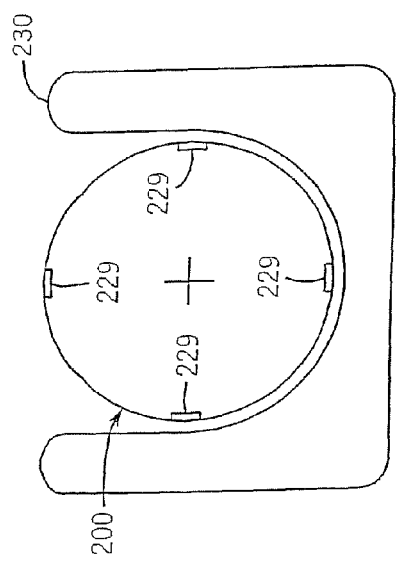
FIG. 2 is rotary drum in accordance with the present invention.

Turning now to FIG. 2, a drum 200 consistent with the present invention is shown. Drum 200 includes four seal bars 229, and a blanket 230 that holds a web or film against drum 200 and seal bars 229. Drum 200 operates generally as the prior art drum, but seal bars 229 include a perforator.

Drum 200 is preferably one similar to the CMD 1270GDS Global Drawtape System® and has approximately 0.5 seconds of seal dwell time at 600 fpm and has an adjustable diameter to easily change product repeat lengths. It has 4 seal bars equally spaced around the circumference that span across a 50" web width. This drum can be used for making trash can liners or garbage bags, for example. Other drums could consist of more or less seal bars, larger or smaller diameter, or narrower or wider web widths.

Figure 3:
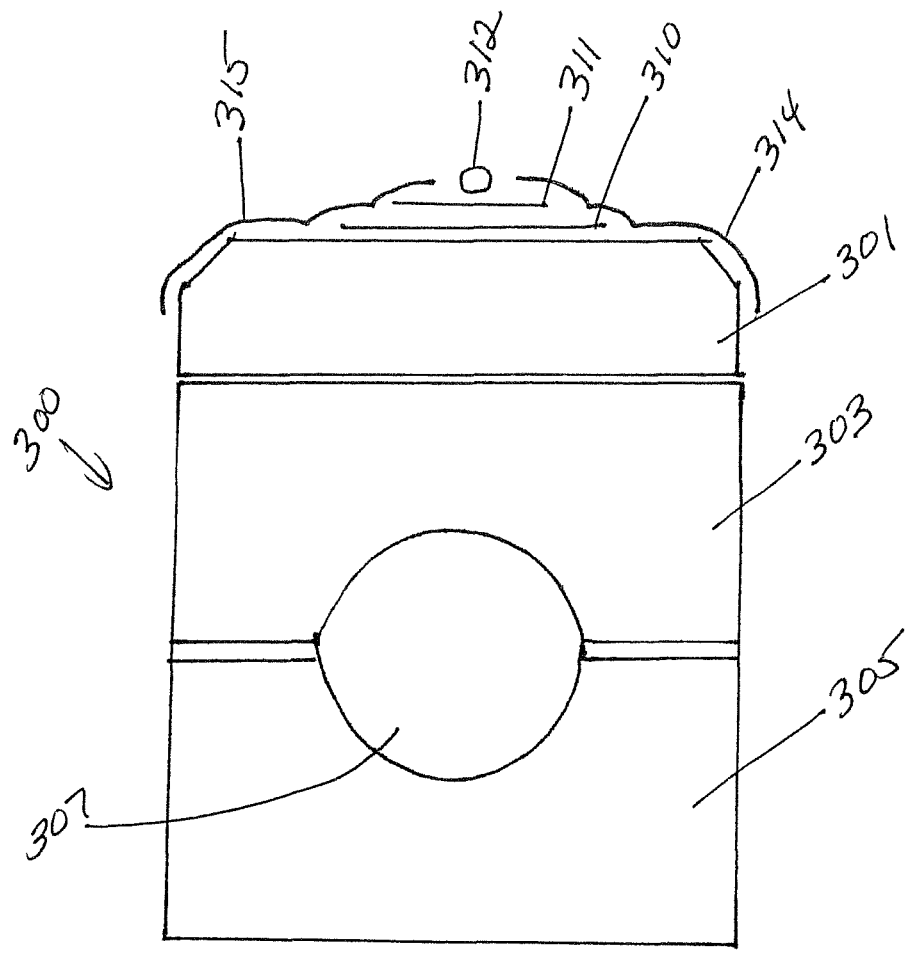
FIG. 3 is an end view of a seal bar in accordance with the present invention.

Referring now to FIG. 3, an end view of a seal bar 300 in accordance with the preferred embodiment is shown. Seal bar 300 includes a cap 301 and portions 303 and 305. A heater cartridge 307 is preferably disposed in split bar portions 303 and 305, to allow for easy replacement of cartridge 307.

Cap 301 is preferably 0.65 inches wide to form a single seal of that width. Two pieces of kapton tape 310 and 311 (each 0.003 inches thick) are taped to cap 301, centered in the machine direction. A perforating wire 312 is mounted on cap 301 (by stitching into cap 301 in the preferred embodiment), over tapes 310 and 311. Tapes 310 and 311 are provided to place perforating wire 312 at a desirable height for obtaining the necessary pressure (of the film between wire 312 and the blanket) for creating the perforation. Tapes 310 and 311 are of different widths, so as to provide a more gradual transition from the cap height to the wire height. This helps the uniformity and integrity of the single seal created by seal bar 300. Tape 311 is 0.25 inches across, and tape 310 is 0.38 inches across in the preferred embodiment. Tapes 310 and 311 are preferably comprised of kapton, to obtain a desired release and wear balance (there is often a trade off between better release of the film vs. greater wear of the tape).

A pair of teflon tapes 314 and 315 are provided over the surface of cap 301, and over tapes 310 and 311, to help release the film and to help create a uniform single seal. Tapes 314 and 315 are preferably 0.002 inches thick.

Seal bar 300 preferably has a uniform temperature range across a given width of a web, with an independently controlled temperature zone at the edge for making a side seal while simultaneously making a tape seal with bar 401.

Wire 312 is preferably NiCr and may be connected to a DC or AC power supply, and can be comprised of multiple wires, such as for providing more heat to the drawtape area. Multiple wires can be separate wires with separate power supplies, parallel wires, or series segments of a wire. Power to the wire may be on constantly, pulsed on and off, or have an otherwise varying power level. Proper timing of the pulses allows the seals to cool prior to where the web leaves the drum, for easier separation of the web from the seal bar.

NiCr wire 312 is stitched into cap 301 such that wire 312 has intermittent contact with the web (such as areas of contact where film is burned away, and areas of no contact where film is not burned away to create perforation tabs). NiCr wire 312 is preferably pulsed on for the first half of the dwell time (the time the web is against the seal bar) and allowed to cool the second half of the dwell time so the perforations are non-molten when the web separates from the perforator. This allows a stronger web, reduces film sticking to the wire, and eliminates the chance of the perforation melting shut.

Cartridge heater 307 is a custom wound heat zone such as those available from Watlow® or Thermal Corp. in the preferred embodiment. The temperature profile for specific or different temperature setting combinations (desirable especially on thin films) may be controlled using compressed air cooling of hot zones, as described below. Air cooling is also used for isolating different temperature zones which are located next to each other but are set at greatly different temperatures such as 300 F (bar 304) for side seals but 450 F (bar 401) for tape seals, in various embodiments.

Figure 4:
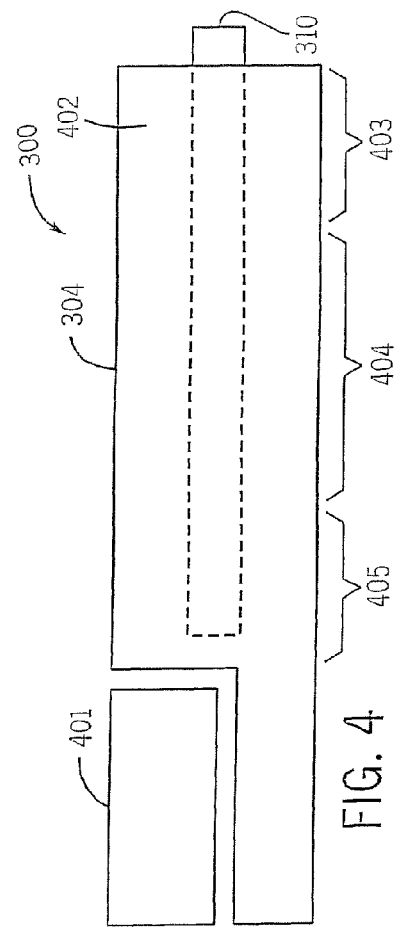
FIG. 4 is a side view of a seal bar in accordance with the present invention.

Referring now to FIG. 4, a side view of seal bar 300 is shown. Seal bar 300 includes, in the preferred embodiment, a first temperature zone 401 for a draw tape seal (or for a hem) and a second temperature 402 for making a side seal. Temperature zone 402 may include multiple temperature zones 403, 404 and 405.

Figure 5:
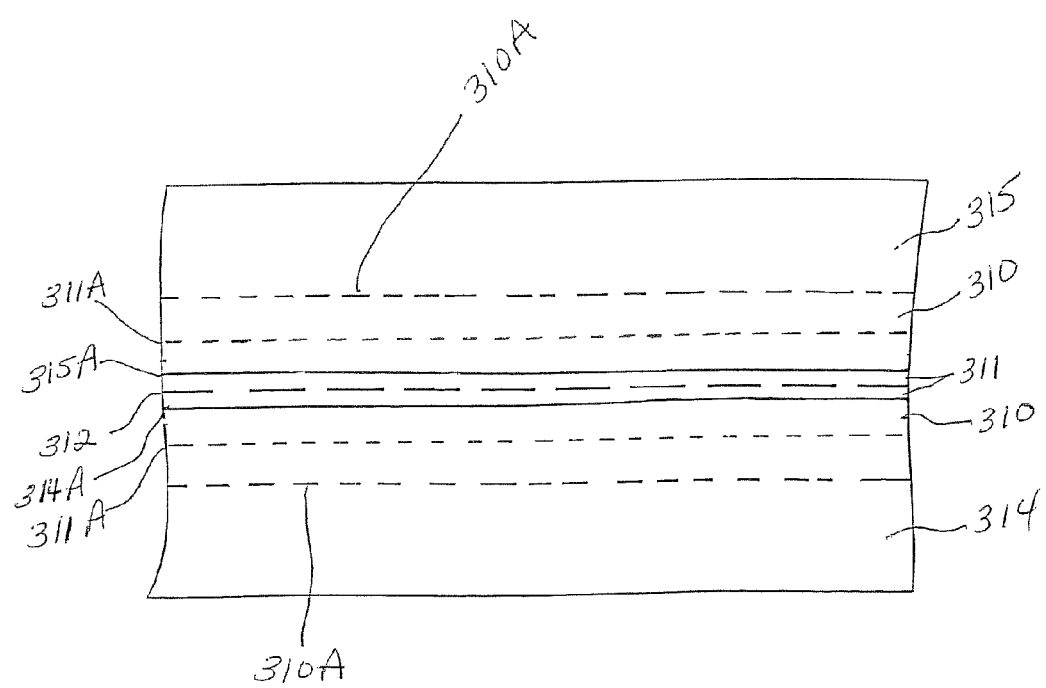
FIG. 5 is a top view of a segment of the seal bar of FIG. 3.
Figure 6:
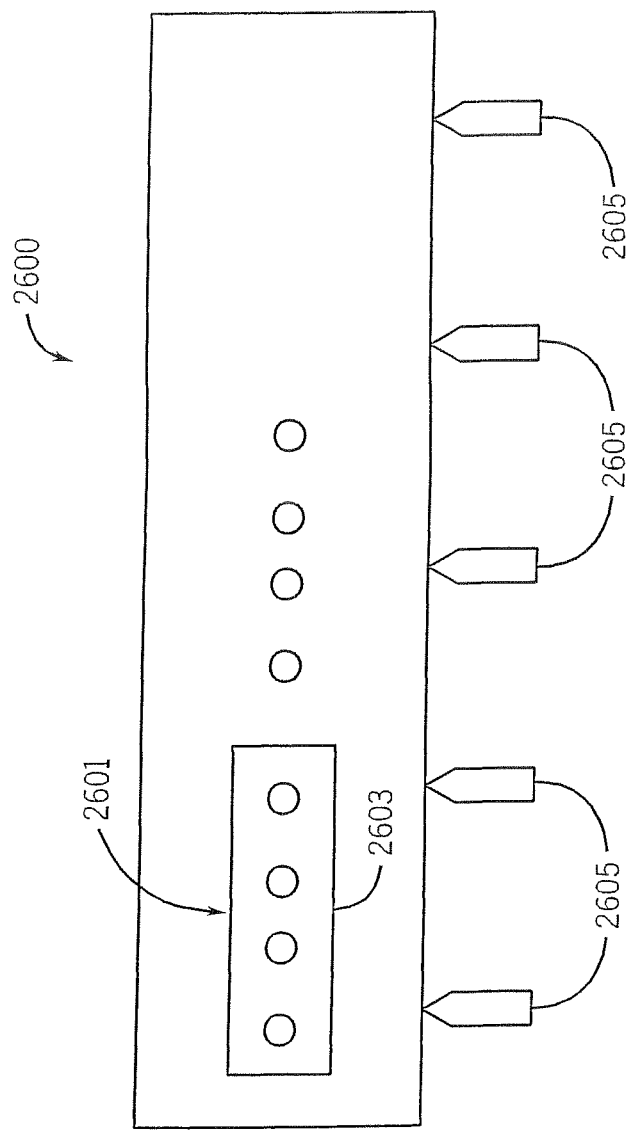
FIG. 6 is a top view of an insert/cap in accordance with the present invention.

Turning now to FIG. 5 a top view of end cap 301 of seal bar 300 of FIG. 3 is shown and produces a single seal, with a perforation or weakened area within the seal. Seal bar 300 may be a generally known seal bar, with the changes described herein. Seal bar 300 is preferably an aluminum bar with a firerod cartridge heater mounted inside, and includes a sealing cap 301 that forms a single seal. Tapes 314 and 315 are release layers disposed on the top of cap 301, to allow the film to release after the seal is formed. The portion of cap 301 shown forms a single seal in a draw tape region of the film or web. A similar portion forms the seal in the non-draw tape area.

The single seal created may have a non-uniform intensity but has sufficient strength throughout to be a single seal with sufficient integrity for the intended use of the bag. Release layers 314 and 315 are preferably Teflon® tape, but alternatives provide for the release material to be Rulon® tape, Kapton® tape, Mica® tape, Resbond® painting, Rescor® paint, and/or RP Polyimide resin poured and baked onto the surface (available from Unitech in VA). One embodiment omits the release layers. Release layers 314 and 315 extends over the side areas adjacent (and outside) the sealing zone in one embodiment (FIG. 3), and do not in another embodiment. Release layers 314 and 315 extend nearly to wire 312 in one embodiment (as shown by the solid lines 314A 315A), and do not extend nearly to wire 312 in other embodiments.

The single sealing zone (the top of cap 301) extends under release layers 314 and 315, and under wire 312. Tape 310 is placed over cap 301, and thus is under tapes 314 and 315 except near wire 312. Because tape 310 is not seen from the top view of FIG. 5, the edges 310A of tape/release layer 310 are shown as dashed. Tape 311 is placed over tape 310, and is under tapes 314 and 315 except near wire 312. Thus tape 311 can be a release layer, particularly near wire 312. The edges 311A of tape/release layer 311 are shown as dashed because they are not visible in the top view of FIG. 5. Tapes 310 and 311 are preferably Kapton® tape, but could be Teflon® tape, Rulon® tape, Mica® tape, Resbond® painting, Rescor® paint, RP Polyimide resin poured and baked onto the surface (available from Unitech in VA), and/or other non-stick materials. Tapes 310 and 311 may be omitted, or additional tapes used, in various embodiments, depending on the desired height of wire 312, for intended applications. Wire 312 is placed at the desired height using methods other than tape, such as by a rounded or raised cap 301, a thin metal plate, etc., in various embodiments.

An electrically insulating coating is preferably used if seal bar 300 and/or cap 301 are aluminum, to prevent shorting of wire 312. If an insert (described below) is used, and the insert is conductive, the insulating coating is used with the insert. Alternatively, the insert could be made of a non-conductive material.

Heating wire 312, preferably NiCr, is disposed within the draw tape area. Heating wire 312 is stitched into single sealing zone/cap 301, and is also stitched through tapes 310 and 311. Alternatively, wire 312 may be stitched into an insert such as those shown below. Cap 301 is preferably used to make replacement easier—rather than replacing an entire heater, or re-applying the release layer and re-stitching a wire, only a new cap with release layers and wire need be applied to the heater. The used cap can be refurbished. Stitched into the sealing zone, as used herein means the wire is placed in holes in the material in which it is mounted, thereby creating an area where the web is not melted away, such as the solid portion between holes in a perforation.

The ratio of the perforator wire 312 height to the seal area width (the width of cap 301) should be selected to obtain good perforations and good seals at the same time for a given application, and can be different for the draw tape area relative to the rest of the seal. When making a single seal 0.65 inches wide, the height of wire 312 can be between 0.015 and 0.025 inches taller than the top of cap 301 in some applications.

Wire 312 terminates at a silver or sliver coated pin (preferably 0.125 inches diameter and 0.75 inches long). A copper wire from the power supply is crimped to the silver pin, thereby connecting wire 312 to the power supply. A similar arrangement is provided for in the non-draw tape region, with cap 301, tapes 310, 311, 314 and 315, and wire 312. Cap 301 may be one continuous cap, or more than one cap extending across the web. The draw tape region has heating wire 312 and the sealing zone raised so that extra pressure is applied, and thus more melting occurs, in the draw tape area. Alternatively only one of, or neither of, the perforating zone and sealing zone can be raised. A draw tape area is raised relative to the remainder of the sealing zone when the draw tape area projects closer to the sealing blanket, thus resulting in greater pressure in the draw tape area. Alternatively, a rubber wheel or auxiliary belt may press against the back of the sealing blanket to increase pressure in the drawtape area.

Heating wire 312 is preferably 80% nickel and about 20% chromium, and/or a thin film heater, and/or a resistance heater, and/or disposed to be make intermittent contact with the web, and/or has a resistance of about 4 ohms/ft, and/or disposed in an insert and/or cartridge on the seal bar in various embodiments. The stitching can ne that described below with respect to other embodiments.

The surface of cap 301 may be arcuate shaped to help create greater pressure throughout the draw tape seal region and thus to transfer more heat and make a satisfactory seal through the extra layers of film present in the draw tape hem. Arcuate shape, as used herein, includes a surface that curves rather than a straight surface, and thus an arcuate sealing surface has a different pressure profile than a straight sealing surface. Alternatives provide for an arcuate shape throughout the entire seal region, or other profiles, including flat.

One alternative embodiment provides for seal bars that form side seals only, with no drawtape seal zone. Cartridge heater 307 is replaced with a flexible silicone rubber heater in another embodiment. The heaters may be held on the sides of an aluminum bar using pressure sensitive adhesive (available from Watlow®).

Another embodiment of the invention includes an insert 2600, or in other embodiments a cap 2600, as shown in FIG. 5, and includes a separate heat zone 2601, such as for heating a hem or draw tape region. Cap/insert 2600 is mounted on a seal bar. Insert, as used herein with reference to a seal bar, includes an assembly mounted on or with the seal bar that is in addition to the sealing zone that creates the seal or seals. Cap, as used herein with reference to a seal bar, includes an assembly that forms the upper part of a seal bar, which is heated to form the seal or seals.

Various embodiments provide for region 2601 to be used with or without a perforation that extends across the film (the perforation could cross a drawtape, and the seal could extend the width of the film, e.g.). Within region 2601, a 0.020 in. mica layer (or a Glasthenn HT® layer) 2603 is provided. A NiCr wire is disposed in a series of cavities or holes (as in FIG. 16). The holes are located every 0.312 inches, and have a 0.030 in. diameter in region 2601. The insert is 0.25 inches wide, and the seals (between which the perforation is made) are 0.25 inches apart.

Figure 7:
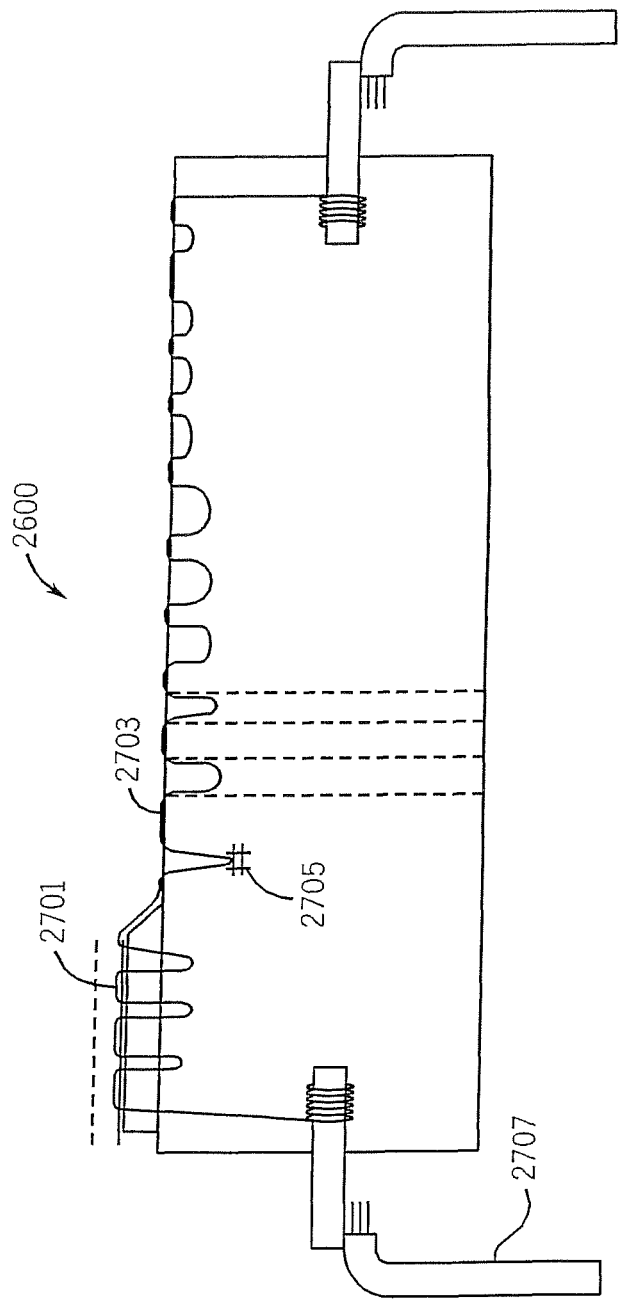
FIG. 7 is a side view of the insert of FIG. 6.
Figure 8:
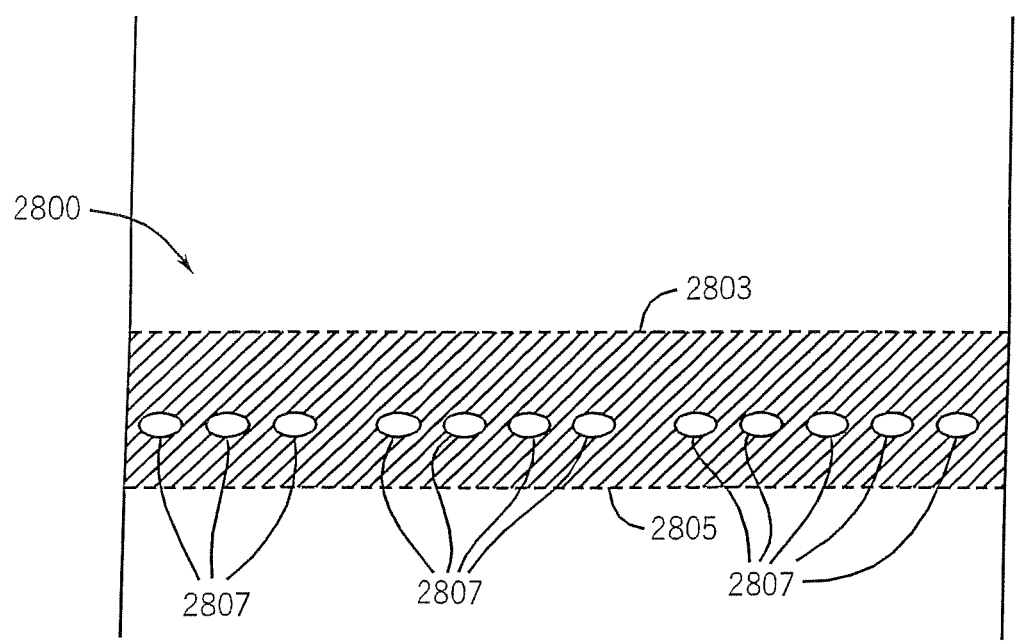
FIG. 8 is a seal and weakened zone in accordance with the present invention.

The side view of insert 2600, shown in FIG. 7, shows a NiCr wire 2701 disposed in the holes in region 2601. The wire preferably has a 0.0089 in. diameter in region 2601. Wire 2701 is serially connected to a 0.0126 NiCr wire 2703 (using a crimp 2705). The larger wire requires larger holes (0.062 in. in the preferred embodiment). The wire sizes can be chosen to select the wire resistance, and thus the heat provided. Wire 2703 is soldered to and/or wrapped around a preferably silver pin to be connected to a high temperature wire 2707 with a crimp connection. A release layer may be placed over the wire or between the wire and insert base. Release material may include: Teflon R® tape, Rulon® tape, Kapton® tape, Mica® tape, Resbond® painting, and Rescor® paint. Release layer, as used herein, includes the surface os a seal bar or perforator that has a coating or layer of material that has properties that help prevent melted film from sticking to the surface, and is on or adjacent the surface that touches the film when the seal or perforation is being created.

The NiCr wire may be turned on and off (current flow) to control temperature of the wire/sealing. For example, the wire may be turned on immediately after contacting the film (or blanket), and turned off immediately after the contact with the film (or blanket) ends. Alternatives include connections other than serial between wires 2701 and 2703, more heat zones (and wire connections/types), controlling heat with external resistors/potentiometers or current magnitude, such as with PWM. If a pot is used the user could adjust the relative temperature by adjusting the pot. Other embodiments includes combining these features, or other on/off schemes. This and other embodiments may be used with any other bag where a perforation needs to be placed next to a seal, such as t-shirt bags, including reinforced t-shirt bags, draw tape bags, side seal bags, etc. The wire may be off for part of the time the seal is being made and on for at least a portion of the time the first seal is being formed. One embodiment calls for preheating the wire when it is not in contact with the film so it is turned off while in contact with the film, relying on the wires retained heat to burn the perforations.

The wire may be held in the holes using a Resbond® high temperature adhesive, injected into the holes using a syringe. Hard or flexible adhesives, or both, alternating, e.g.) may be used. Flexible adhesives allow the wire to flex, which can occur when it is heated and cooled. The insert may be held in place with five cone point set screws 2605 or with flat tip set screws.

Other alternatives provide for wire 1502 to be round, a rectangular ribbon, straight or woven at a uniform or varying pitch, uniform thickness or non-uniform thickness along their length (to create hot/cold spots), Toss® wire, tapered, or profiled to make two side seals between a burn off cut. Profiled wire may have intermittent copper plating to perforate rather than clean cut. Varying pitch for a woven wire or different hole spacing creates a weakened area of varying weakness, that allows the bag to be torn by hand easier at the edge than in the middle of the web. Other designs contemplated include flexible silicone rubber heaters, thick film heating technology, sintered ceramic, or the like available from Watlow Electric Manufacturing Co. Yet other alternatives include using thin film heating technology mounted on a PNEUSEAL™ rubber inflatable diaphragm that can stay hot all the time but physically move in and out of contact with the film by inflating and deflating the diaphragm.

The preferred embodiment controls the heat of a burn-perf wire by controlling an AC voltage. AC is preferred for cost, although DC voltage control may provide better control. Preferably the lowest voltage that provides an acceptable perforation is used. For example, a 0.013" diameter 80/20 Ni—Cr wire woven alternating between 0.25 inch in contact with the web and 0.12 inches below the mica requires approximately 20 watts per inch of web width to burn perforations in 0.75 mil LLDPE film two layers thick at 600 feet per minute. Thus, a 2 inch long perforator would use 10 volts pulsed on for about 0.25 seconds as soon as the film is sandwiched between the perforator and the seal blanket. With a 0.5 second dwell time, the perforation has about 0.25 seconds to cool. The preferred embodiment thus allows the perforation to be quickly heated and cool down. The adjustable voltage is supplied by a DC motor controller in one embodiment. Other embodiments includes a mechanical rheostat, potentiometer, or adjustable resistor. An adjustable AC voltage can preferably be used.

A controller may be used to compensate for resistance changes over the life of the wire. For example, a Toss® controller has current sensing feedback and adjusts voltage accordingly to maintain a more consistent temperature. Cartridge heaters may be controlled with thermocouple feedback using PID temperature control, as is well known in the industry.

Figure 14:
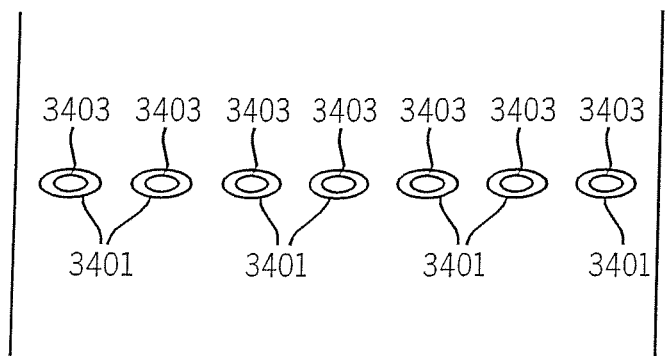
FIG. 14 is a seal and weakened zone in accordance with the present invention.

Other embodiments provide for making a vented bag, such as a leaf bag. A vented leaf bag may only require seals 3401 around each perforation 3403, without a continuous seal, as shown in FIG. 14. The single seal/perforation may be created using a contoured seal bar, and/or previous embodiments with the temperature controlled to burn through in places.

The single seal may also be created using one seal bar, or two disposed such that the two seals blend together to form a single seal (i.e., no unsealed web between them) comprised of two sub-seals. The sub seals are generally parallel and extend across the web or film in the cross machine direction, and a weakened area is formed between the generally parallel sub-seals. The perforation may be made using any of the alternatives described above. Another embodiment provides for using one of the embodiments above, but is used by turning the side seal temperature very low so that the seals are not formed. The perforator then forms the perforation and the seals are the auxiliary seals from the perforation.

Referring to FIG. 9, one embodiment of a seal bar 2900 that includes a single sealing zone and a weakening zone disposed within the single sealing zone is shown. The single seal, with the perforation formed therein, preferably extends at most 0.25 inches in the machine direction, or more preferably at most 0.125 inches in the machine direction on film 2912 after the seal and perforation have been formed. Extending in the machine direction, as used herein, includes the average distance over a portion of a seal along lines running parallel to the film edge.

Seal bar 2900 forms a single seal on a web or film 2912. A cartridge heater 2901 disposed within an aluminum block 2903 provides steady heat to seal bar 2900. Wire or resistance heater 2911 provides additional heat that creates the seal and weakened area. Wire 2911 is preferably a NiCr wire 0.009-0.013 inches in diameter. The different sources of heat combine so that both add heat to the seal zone and the weakening zone, although in this embodiment wire 2911 primarily provides heat for the weakening area, and heater 2901 primarily can be thought of preheating the assembly.

Alternatives provide for a flat or other shaped resistance wire. The flat wire can have a raised ridge or be curved to form the weakening zone, with cutouts where the solid portions between perforation holes are located. Air under the bend can act as an insulator to affect the heat profile of the ribbon.

A shim 2905 can be used, particularly for retrofits, to force wire 2911 into tighter contact with web 2912. Other embodiments call for greater shimming in the hem or draw tape area (of about 0.020 inches in one embodiment), so the web in that area is under greater pressure than the remaining portion of the film, thus providing greater heat transfer for this region, or no shim at all. Another embodiment provides for a backing wheel behind the blanket in a hem or draw tape region that forces the blanket against the web and provides greater pressure in that region.

An insert 2907 is preferably comprised of, or coated with, an electrical or thermal insulating material to insulate wire 2911. In various embodiments insert 2907, or the electrical insulating material, is comprised of mica, glastherm, fiberglass phenolic, plastics, polymers, aluminum (with an electrically insulating coating) or other materials. Glasthenn™, as used herein, includes, a composite material of glass fibers and heat resistant thermosetting resins A releasing layer 2909 is disposed over insert 2907, and is preferably comprised of Teflon®, Rulon®, or Kapton® tape. The releasing layer or releaser is chosen to be of a material that releases melted film, but able to withstand the temperatures needed to seal and perforate the film. Releasing layer on a seal bar or insert, as used herein, includes, a layer that, compared to other materials of the seal bar or insert, reduces the buildup of melted film on the seal bar or insert. This embodiment provides that the film touches only the wire and tape (over the insert), although other embodiments provide that the film touches the insert directly, and/or touches the aluminum block heater. Alternatives provide for coating the wire with a releaser instead of or in combination with the releasing layer. The release maybe an application of a liquid layer that later dries such as Resbond®, Rescor®, Teflon® paint, silicone paint, or the like.

The single seal can extend across the entire film width, or across part of the film with two seals used in one region, such as a hem or draw tape region. The two seals may be formed as described above. Another embodiment provides for two sub seals to be used only in the draw tape area, and a single seal without sub seals formed elsewhere or vice versa.

The selection of various materials, such as the releaser, insulater, heater, wire, etc., is should be made in consideration of the film thickness, the temperatures desired for perforating (up to 600 F or more in one embodiment) and sealing the major portion of the film and any hem or draw tape region, and the ability of the sealing surface to release melted film. Improper selection could result in premature wear of the material, or premature buildup of melted film on the sealing surface. Alternatives provide for turning on the wire earlier to preheat it, so it can be turned off sooner, removing the built up film during the time the film is not in contact with the seal bar by, for example, mechanical action, heating, brush, or air blast, etc.

Other design concerns include the range of types and thicknesses of films that will be used with the machine, heat migrating between the hem and other regions, the perforation and the seal, blanket material, dwell time, removing or addressing wrinkles in the film, ink from the web building up on the sealing surface, and providing different pressure zones.

Referring to FIG. 11, another embodiment of a seal bar 3000 that includes a single sealing zone and a weakening zone disposed within the single sealing zone is shown. The general description of the seals formed, and design considerations above, apply to this and other embodiments. A wire or resistance heater 3003 mounted on an aluminum heater 3001 creates the seal and weakened area. Mounted on, as used herein, includes directly in contact with, or with other layers or items disposed there between. Heater 3001 may be a support bar rather than a heater. Wire 3003 may be as described above, and a releaser may be provided under wire 3003, over wire 3003, or wire 3003 may be coated, if needed. Wire 3003 is preferably a NiCr wire stitched into an aluminum bar with an electrically insulative coating and/or the wire is coated with an electrical insulator. Preferably, the wire is coated with a releaser (which may also be the insulator)

Referring to FIG. 11, another embodiment of a seal bar 3100 is similar to seal bar 3000, but heat is provided by a thin film heater 3103 in addition to a wire 3103 and a support bar or heater 3101, to create the seal and weakened area on a web 2912.

Referring to FIG. 12, another embodiment of a seal bar 3200 is similar to seal bar 3100, but an insulator 3202 is provided between a thin film heater 3203 in addition to a wire 3207 and a support bar or heater 3201, to create the seal and weakened area on web 2912.

Figure 13:
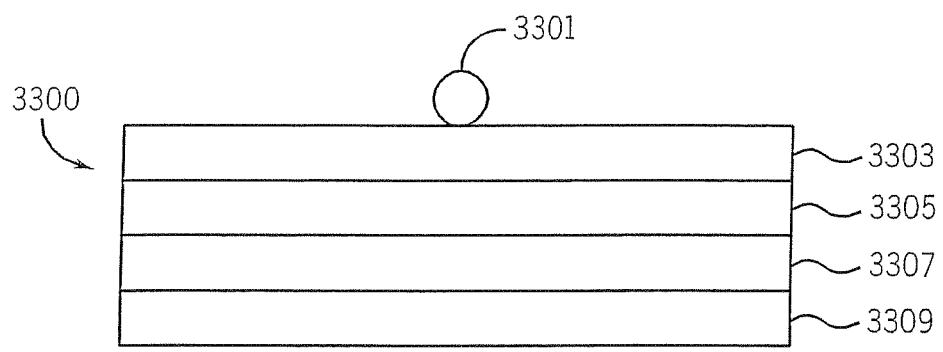
FIG. 13 is an end view of a sealer/perforater in accordance with the present invention.

Referring to FIG. 13, a schematic of a single sealer/perforator 3300 comprises a strip that may be affixed to a seal bar or a seal bar insert. Sealer 3300 is easily replaceable, and thus useful for applications where film builds up on the sealer. Sealer 3300 includes a NiCr wire 3301 (which may be similar to wires described above), a releaser 3303 that is also preferably an electrical insulator and may be similar to the releasers described above, a thermal or heat conducting layer 3305, preferably comprised of aluminum to spread the heat created by a resistance trace heater 3307, all of which is mounted to two sided tape 3309. Thus, tape 3309 can be affixed to the top of an insert for use on a support bar or seal bar, or taped directly to the seal bar.

One modification of this embodiment provides for the releaser to be a tape placed over the wire, and there may or may not be holes or slits on the releaser aligned with the locations where the perforations holes are to be made, so that the wire contacts the film in these locations.

Figure 15:
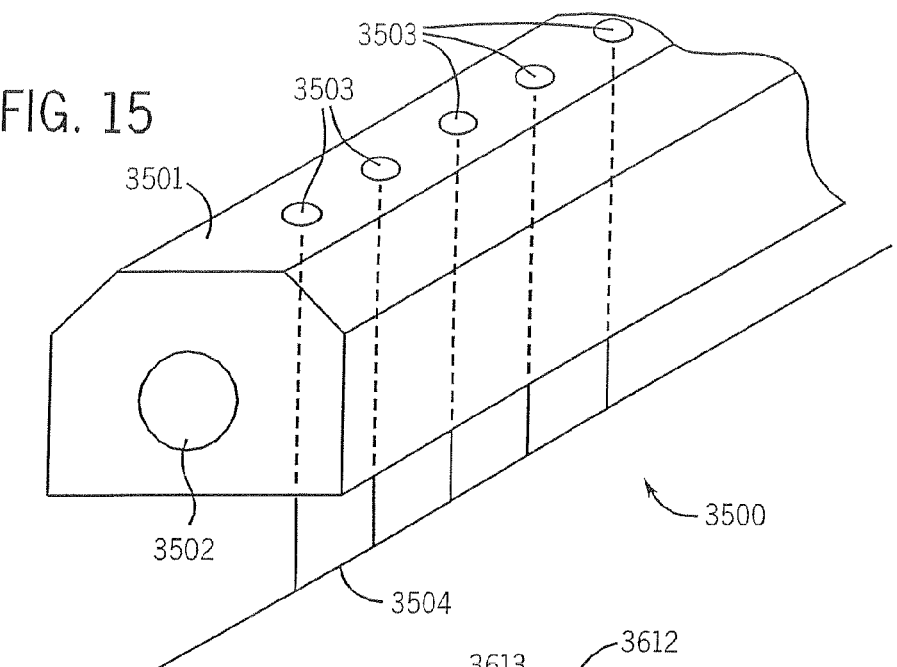
FIG. 15 is a perspective view of a segment of a seal bar in accordance with the present invention.

Referring not to FIG. 15, a perspective view of a seal bar insert 3500 is shown, and includes heated aluminum block 3501, with the a heater cartridge 3502. A plurality of pins 3503 extend through the seal bar and create a micro perforation. Pins 3503 are disposed in holes in block 3501 that are disposed at an angle to avoid cartridge 3502. Pins 3503 may be conductive and connected to a wire 3504 to heat pins 3503 to aid in perforating and//or sealing. This embodiment, and the other alternative embodiment may be combined as desired. For example, pins 3503 may be used with a vacuum through the holes holding pins 3503, and/or they may be combined with one of the many ways of creating the seal and perforations described above on a single seal bar, where the micro perforations aide in creating the weakened zone, or pins 3503 may be the sole manner of forming the perforation.

The row of pins or needles are in an unheated or heated seal bar and press against a Kevlar® sealing blanket material, which will be less likely to be damaged from the sharp pins penetrating into it, in another alternative. The rows of pins or needles could be placed in blanket, and be held in phase with seal bars on the drum, to create the perforation.

Similarly, thin film heaters and/or pins on a belt or blanket can press against a simple drum face. No drum would be required if pressure is applied by the belts against one another, such as by an elliptical shaped belt path for both belts.

Another embodiment provides for the seal and perforation to be formed using magnetic fields or inductive heat. A magnet (permanent or electric) on the seal bar, with metal in the backing blanket causes extra pressure in the perforation area to melt holes where desired and less pressure in the sealing area. The magnetic fields can be created to be disposed in a line across the film.

Another embodiment provides for the seal and perforation to be formed together on a non-circular loop, such as an oval or oblong, or on a shuttle machine. generally, the invention of these embodiments call for the creation of a seal when and where a perforation is created.

Other methods of perforating and sealing at the same time in a rotary drum to preferably create a perforation down the middle of one narrow seal are included withing this invention. For example, three staggered rows of NiCr wire stitches may be used where the outer two rows create the seals and the inner row creates the perforation. Inner refers to the inner in the machine direction.

One seal may be made with one rounded seal tip when the film is under tension such that the center of the seal thins/weakens/perforates during the sealing process. The seal bar may have a bumpy surface at the crest to create the perforations.

A seal bar may comprise a resistive coating placed over a shaped electrically non-conductive material so the heat is generated at exactly the sealing surface where it is needed and a complex shape with various sealing heights can be achieved. This could be done adapting thin film heater technology.

Another embodiment calls for increase sealing blanket pressure, such as by factor of 5, 10 or 20, preferably 10, so the burn-perforation temperatures can be lowered from 550 F-600 F to a lower temperature where a wider variety of coatings and materials are available (many materials have a 500 F maximum operating temperature).

Yet another embodiment provides for a sealing bar comprising two parallel heated strips that separate 0.03" to 0.06" during sealing to stretch the film into a line of weakness or perforations between the two strips.

Film could be tucked into a ⅛" deep recess in the drum seal bar such that perforations can be cut or burned below the surface of the drum without damaging the sealing blanket. The tucking can be mechanical or vacuum assisted.

Other methods of creating the seal and perforation could be used, such as using radiant heat, microwaves, or light waves tuned to especially heat and perforate the web. Hot glue could be applied, or a liquid from inside drum such that it heat seals the two poly webs together. The perforations could be done simultaneously if hot liquid burns perforation holes at the same time. A hot solid such as sand or poly pellet, or a hot liquid, such as oil, could be forced through web such that it perforates the web while forming a seal at the same time. Or the web could be chemically treated to react with an additive such that film melts together and melts perforation holes where excess chemical is applied. Another alternative includes applying a time activated acid in the drum which allows the web (non-sealed and non-perforated) to be wound and placed inside a carton; then the time activated acid creates a burn-off seal so the web later becomes multiple sealed/separated bags.

The web could be sealed with conductive heat sealing, and before the dwell time is over the web could be cryogenically frozen in a perforation pattern such that the film fractures at each perforation spot when it is flexed downstream.

Figure 16:
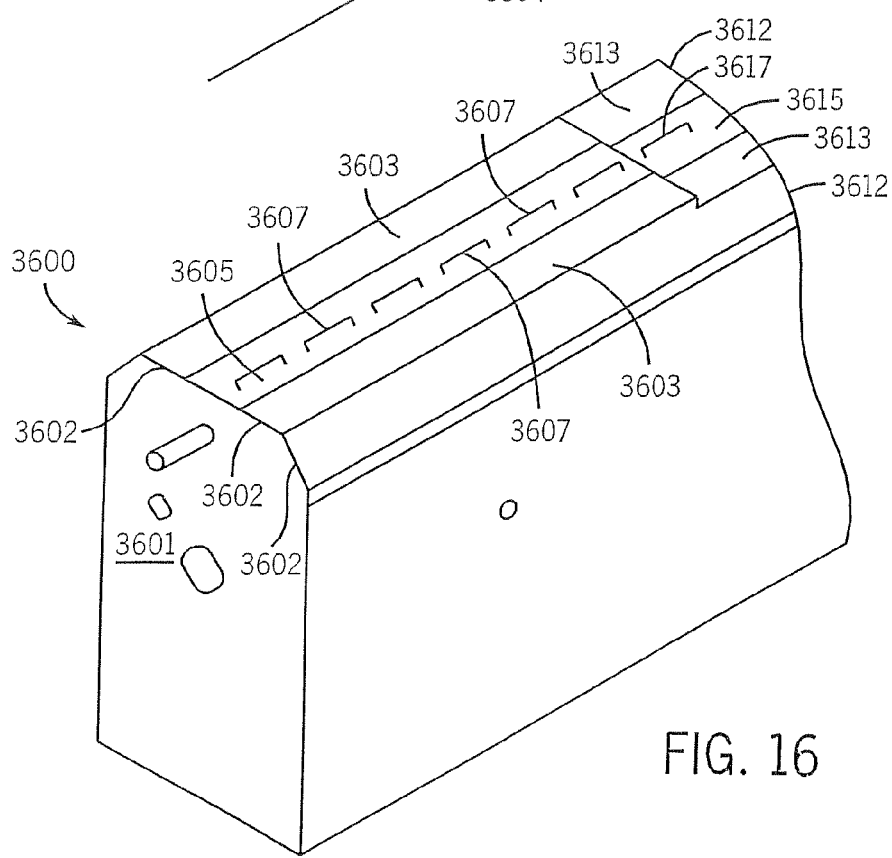
FIG. 16 is a perspective view of a segment of a seal bar in accordance with the present invention.
Figure 17:
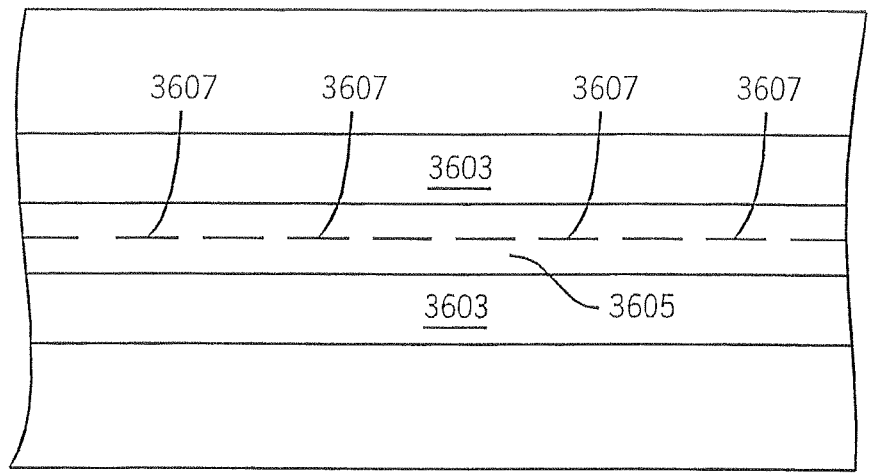
FIG. 17 is a top view of a portion of the segment of the seal bar of FIG. 16.

Turning now to FIGS. 16 (perspective view of a seal bar), 17 (top view) and 18 (end view of a cap), an embodiment of the invention that produces a single seal, with a perforation or weakened area within the seal is shown. A seal bar 3600 may be a generally known seal bar, with the changes described herein. Seal bar 3600 is preferably an aluminum bar with a firerod cartridge heater mounted inside, and includes a single sealing area 3602 under a release layer 3603 that forms a single seal in a draw tape region of a web.

Another single sealing area 3612 under a release layer 3613 forms a single seal across the remainder of the web (the non-draw tape area). The single seal created may have a non-uniform intensity but has sufficient strength throughout to be a single seal with sufficient integrity. Release layers 3603 and 3613 are preferably Teflon® tape. Single sealing zone 3602 extends under release layers 3603, and under a release layer 3605. Release layer 3605, with a perforator/heating wire 3607 create a perforation or weakened zone in the draw tape region of the web. Release layer 3605 is preferably Kapton® tape. The alternatives described above may be used with this embodiment.

A heating wire 3607, preferably NiCr, is disposed withing the draw tape area. Heating wire 3607 is stitched into single sealing zone 3602, and is also stitched through release layer 3605. Alternatively, wire 3607 may be stitched into a cap 3801 (FIG. 18) made of aluminum or another type of material.

Figure 18:
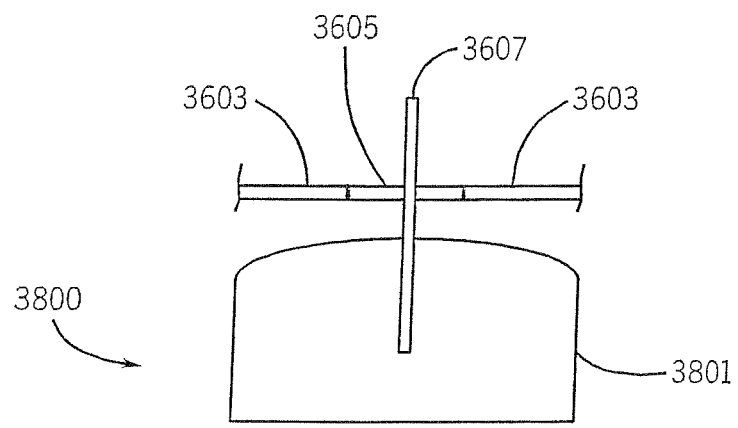
FIG. 18 is an end view of a cap that may by used with the seal bar of FIGS. 16 and 17.

FIG. 18 shows an end view of cap 3801, with release layers 3603 and 3605 on it, and wire 3607 is shown stitched into cap 3801 and release layer 3605. Cap 3801 extends across less than the entire sealing sealing zone 3603 in another embodiment. Wire 3607 is mounted on top of cap 3801.

The various alternatives may be combined as desired, to design a bag machine suited to a specific need.

Numerous modifications may be made to the present invention which still fall within the intended scope hereof. Thus, it should be apparent that there has been provided in accordance with the present invention a method and apparatus for making bags that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A cap for a sealer for a rotary bag machine comprising a base having a layer of material mounted thereon, wherein the layer of material is such that melted film is less likely to stick to the layer than the base, and wherein the layer is disposed to the film when a seal or perforation is being created, and a heating wire stitched into the release layer and into the base, and wherein the cap includes a sealing area and a perforating area.

2. The cap of claim 1, wherein the layer is comprised of a first material adjacent the heating wire and a second material elsewhere on the of the surface of the cap.

3. The cap of claim 2, wherein the heating wire is a NiCr wire.

4. The cap of claim 3, wherein the heating wire is raised in a draw tape area relative to the remainder of the sealing area.

5. The cap of claim 4, wherein there are a plurality of holes in the cap and the heating wire is mounted in and between the plurality of holes.

6. The cap of claim 3, wherein there are a plurality of holes in the cap and the heating wire is mounted in and between the plurality of holes.

* * * * *